United States Patent [19]
Connell

[11] 4,165,831
[45] Aug. 28, 1979

[54] BACK-UP PAD FOR WELDING

[75] Inventor: Talbert D. Connell, Conroe, Tex.

[73] Assignee: Crutcher Resources Corporation, Houston, Tex.

[21] Appl. No.: 892,945

[22] Filed: Apr. 3, 1978

[51] Int. Cl.² ............................................. B23K 5/22
[52] U.S. Cl. ................................................. 228/50
[58] Field of Search .................... 228/50, 46, 49 B; 219/160, 158, 161

[56] References Cited

U.S. PATENT DOCUMENTS

| | | | |
|---|---|---|---|
| 2,878,770 | 3/1959 | Work | 228/50 |
| 3,110,277 | 11/1963 | Dixon | 228/50 |
| 3,458,105 | 7/1969 | Valentine | 228/50 |
| 3,561,320 | 2/1971 | Nelson | 228/213 |
| 3,741,457 | 6/1973 | Gwin | 228/50 |

FOREIGN PATENT DOCUMENTS 423595 10/1974 U.S.S.R. ................... 228/50

*Primary Examiner*—C. W. Lanham
*Assistant Examiner*—Gene P. Crosby
*Attorney, Agent, or Firm*—Richards, Harris & Medlock

[57] ABSTRACT

An improved back-up pad apparatus for use in externally welding abutting ends of pipe is formed of hard anodized aluminum material and comprises a plurality of arcuate back-up pads for interior positioning to face the weld. Each arcuate pad is mounted on a shoe for biased engagement with the interior cylindrical surfaces of the pipes. Intermediate shoes carrying cylindrically surfaced members are provided at the rounded ends of adjacent back-up pads.

7 Claims, 4 Drawing Figures

4,165,831

BACK-UP PAD FOR WELDING

BACKGROUND AND SUMMARY OF THE INVENTION

This invention relates generally to the art of welding, and more particularly to a system having an improved back-up pad apparatus for use in welding together the ends of pipes.

The construction of a pipeline involves the joinder of numerous lengths of pipe. Each successive length of pipe is positioned end to end with respect to the preceding length of pipe. The ends of the pipes are then joined by welding. In such welding operations, a strip of material known as a back-up pad heretofore has been applied to the surfaces of the pipes to be joined. The pad faces the line of the weld on the side oposite to that from which the welding operation is to be performed. The use of a back-up pad supports the molten weld material during the weld operation. Formation of irregularities at the joints which could interfere with fluid flow through the pipeline is prevented in this manner. More importantly, the use of a back-up pad results in a more structurally reliable weld. It will be appreciated that back-up pads must be constructed of a durable material to withstand the elevated temperatures surrounding a welding operation.

The prior art contains numerous examples of back-up pads for use in a welding operation. The prior art approaches include utilization of various materials in conjunction with differing designs. For example, back-up pads formed of copper material have been used. One problem involved in using copper back-up pads is that melted copper can become mingled with the welding material or the molten pipe metal, resulting in a weak weld and possible failure of the joint. Another problem involves the relatively short useful life of copper back-up pads. Other materials have also been utilized for back-up pads but suffer from similar disadvantages. Heretofore there has not been available a back-up pad capable of extended useage in providing strong uniform welds. There is thus a need for an improved back-up pad apparatus for use in the construction of a pipeline wherein each weld joint is critical.

The present invention comprises an improved back-up pad apparatus which overcomes the foregoing problems and other difficulties associated with the prior art. In accordance with the broader aspects of the invention, there is provided a back-up pad apparatus exhibiting improved performance characteristics over the teaching of the prior art. Each arcuate back-up pad is formed of a hard anodized aluminum material and is capable of multiple useage. Use of the back-up pad of the present invention results in strong and reliable welds between each length of pipe in a pipeline.

According to more specific aspects of the invention, an improved back-up pad apparatus comprises a plurality of arcuate back-up pads mounted on supporting shoes. A groove is provided in the periphery of each back-up pad. The back-up pads include rounded ends and are formed of hard anodized aluminum. Each back-up pad is centrally supported by a support shoe for biased engagement against the interior cylindrical surfaces of two lengths of pipe to be welded. Cylindrically surfaced members carried by intermediate support shoes are provided between the rounded ends of adjacent back-up pads. In one embodiment, the support shoes are slidably mounted on the actuator rods of pipe clamping shoes for radial movement therewith.

DESCRIPTION OF THE DRAWINGS

A more complete understanding of the invention can be had by reference to the following detailed description in conjunction with the accompanying drawings, wherein.

DETAILED DESCRIPTION

Figure 1:
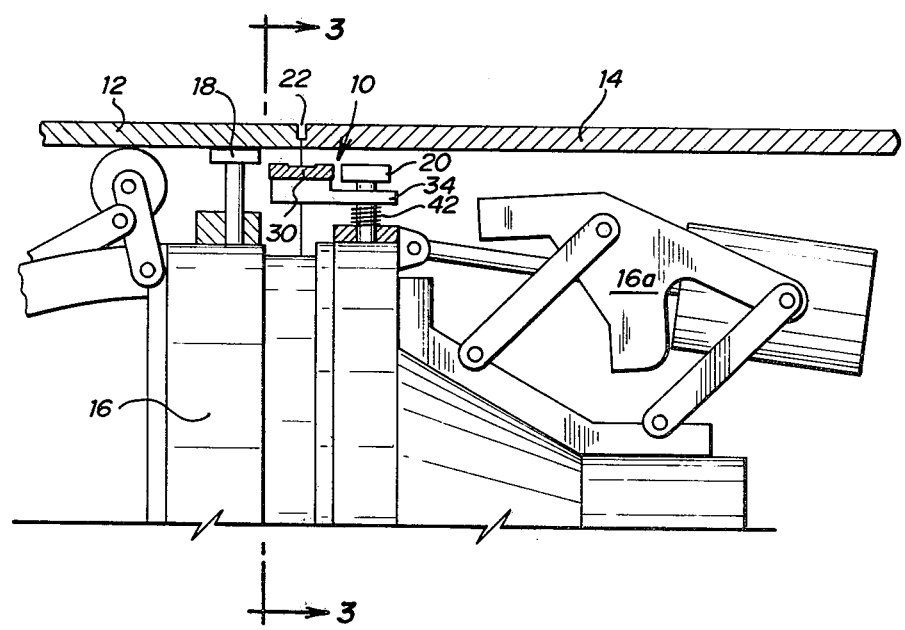
FIG. 1 is a partial vertical section view showing an improved back-up pad apparatus incorporating the invention and installed for use with a pipe aligning/clamping mechanism.

In the drawings, like reference numerals designate like or corresponding parts throughout the several views. Referring to FIG. 1 there is shown an improved back-up pad apparatus 10 incorporating the invention. The back-up pad apparatus 10 is utilized in the operation of welding pipes 12 and 14 in end to end relationship. Use of the back-up pad apparatus 10 results in a reliable and strong girth weld between pipes 12 and 14.

The back-up pad apparatus 10 is mounted on a pipe aligning/clamping mechanism 16 such as that described in U.S. Pat. No. 3,561,320 issued Feb. 9, 1971, the disclosure of which is hereby incorporated by reference. Only a portion of the clamping system is shown herein but is fully shown and described in said patent. The aligning/clamping mechanism 16 is adapted to firmly grip two lengths of pipe in proper relative positions for welding. The mechanism 16 travels inside the pipeline comprising pipes 12 and 14. Mechanism 16 contains actuators, such as double-acting cylinders, for moving toggle elements which in turn move groups of circumferentially spaced pipe clamp shoes 18 and 20. Clamp shoes 18 and 20 are selectively moved into and out of engagement with the inside surfaces of pipes 12 and 14, respectively by hydraulic means (not shown). Clamp shoes 18 and 20 are affixed to the ends of piston rods 38 slidable with respect to a portion of the housing of mechanism 16. After mechanism 16 is properly positioned with respect to the end of pipe 12 by actuation of toggle system 16a clamp shoes 18 are actuated outwardly to lock mechanism 16 in place. Pipe 14 is then moved into abutting relationship with the end of pipe 12, forming joint 22, whereupon clamp shoes 20 are actuated outwardly to lock the pipes in fixed positions and to hold them thus clamped during welding at joint 22. After completion of the weld, mechanism 16 is released and moved to the other end of pipe 14 preparatory for the next weld operation. As will be more fully described hereinafter, back-up pad apparatus 10 is brought into biased engagement with the inside surfaces of pipes 12 and 14 simultaneously with extension of clamp shoe 20 to support the weld.

Figure 2:
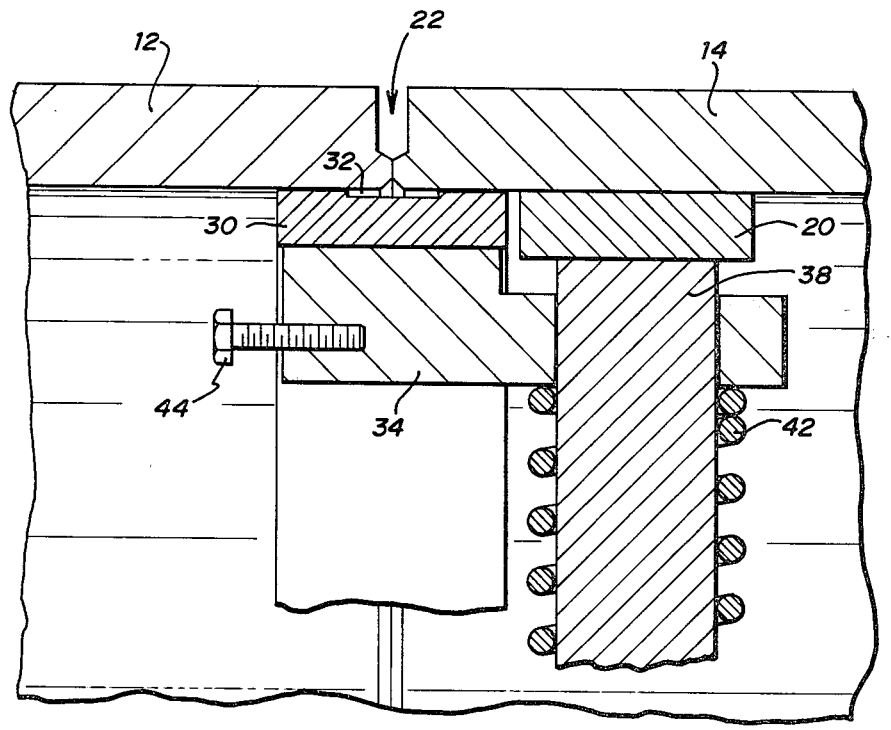
FIG. 2 is an enlarged partial section view taken along lines 2—2 of FIG. 3 in the direction of the arrows.
Figure 3:
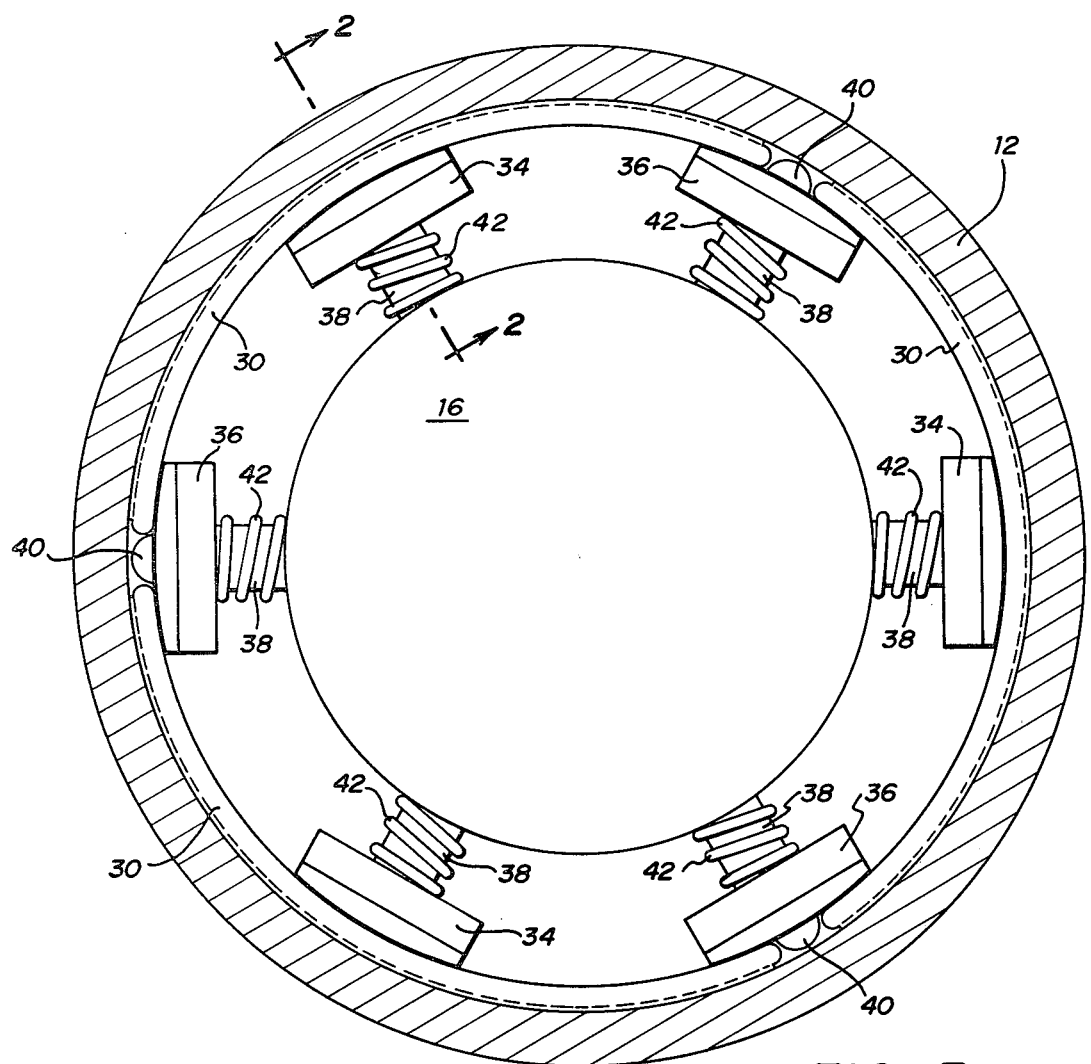
FIG. 3 is a complete enlarged side elevational view of the invention taken along lines 3—3 of FIG. 1 in the direction of the arrows.

FIG. 3 in conjunction with FIG. 2 shows construction details of back-up pad apparatus 10. Apparatus 10 comprises a plurality of arcuate pads 30 having curvatures corresponding to the inside surfaces of pipes 12 and 14. Each pad 30 comprises an arc defining a portion of the particular inside diameter of pipes 12 and 14.

Each pad 30 has rounded ends as is best shown in FIG. 3, and a central groove 32 in the outside convex surface thereof as is best shown in FIG. 2. For example, each pad 30 can be approximately 1.5 inches wide and 0.375 inch thick, with groove 32 being 0.6 inch wide and 0.02 inch deep. Each pad 30 is preferably formed of a single piece of aluminum. Type 6061 T6 aluminum is preferably used, however type 7075 aluminum or type 2024 aluminum can also be used if desired.

In a preferred embodiment of the invention, the pads 30 are finished with a hard anodizing process so that the surfaces are coated with approximately 2 mils of aluminum oxide. Hard anodizing with sulfuric acid at approximately 25 degrees F in accordance with United States Military Specification Number 8625 has been feed satisfactory. Such anodizing is performed by the Anodite Company, 711 W. Hurst Blvd., P.O. Box 547 of Hurst, Tex. 76053.

It will be understood that the use of hard anodized aluminum for pads 30 is significant to the present invention. Such pads have been found to yield superior results when utilized as back-up pads. Back-up pads 30 formed in accordance with the invention exhibit greater tolerance to the high temperatures which accompany a welding operation, resulting in significantly extended part life. More importantly, the use of hard anodized aluminum for pads 30 eliminates contamination of the welded pipe joints, which enhances structural integrity of the pipeline.

Back-up pads 30 are supported on pad shoes 34 and 36 for radial movement relative to the pipes 12 and 14. Pad shoes 34 and 36 are preferably constructed of hard anodized aluminum identical to that employed for pads 30. Pad shoes 34 and 36 are adapted to be slidably mounted on piston rods 38 of clamp shoes 20. The other ends of pads shoes 34 and 36 are configured to engage the underside of pads 30. Each pad 30 is mounted at the central portion thereof to a pad shoe 34. In accordance with the preferred construction, pads 30 are bolted to pad shoes 34 through the raised portions at the sides of grooves 32. It will thus be appreciated that pads 30 are affixed to pad shoes 34 for movement therewith.

An intermediate shoe 36 is positioned radially inward and adjacent to the rounded ends of adjacent pads 30. For example, when utilizing three pads 30 of approximately 120 degrees each as in the preferred construction of the invention, three intermediate shoes 36 are also required. Each intermediate shoe 36 supports a semicylindrical member 40 secured thereto. Members 40 extend in a longitudinal direction parallel to the axis of the pipeline and are mounted so as to occupy space between ends of adjacent pads 30 as shown in FIG. 3. Intermediate shoes 36 are not, however, mechanically connected to back-up pads 30. It will be appreciated that the ends of adjacent pads 30 are slidably contacted on shoes 36.

Shoes 34 and 36 are biased outwardly by compression springs 42 surrounding the piston rods 38 of shoe clamp 20. Upon extension of clamp shoes 20, shoes 34 and 36 are simultaneously biased outwardly by springs 42. The back-up pads 30 are thus caused to make firm engagement with the inside cylindrical surfaces of pipes 12 and 14 in the region of the joint 22. With the back-up pads 30 thus positioned, the welding of joint 22 may proceed. The weld may be installed manually by stick welding or automatically as described in U.S. Pat. Nos. 3,604,612 and 3,806,694. It will be appreciated that molten weld material will be retained in the grooves 32 of back-up pads 30 to form a neat inside seam. In addition, the inside seam will be substantially uniform about the girth of the pipeline, except for the spaces between the ends of adjacent pads 30. However, the placement of semicylindrical members 40 between the rounded ends of pads 30 substantially fills this space to both localize and minimize the seam irregularities.

The rounded ends of pads 30 and the cylindrical surface of members 40 contribute to long life by lowering localized heating heretofore experienced with pads having sharp or abrupt changes in configuration.

After completion of the weld the back-up pads 30 are retracted with retraction of clamp shoes 20. It will be appreciated that inward radial movement of pads 30 causes the ends thereof to draw closer. As they do so, they ride up on semicylindrical surface of members 40. This sliding movement occurs smoothly and naturally as a result of the rounded geometries of the parts. Upon the next extension of shoes 34 and 36 the ends of pads 30 slide downward on the sides of cylindrical members 40 and draw apart again to the positions shown in FIG. 3. If desired, each back-up pad support shoe 34 and 36 can be provided with one or more adjusting screws similar to screw 44 shown in FIG. 2 for effecting proper alignment.

Figure 4:
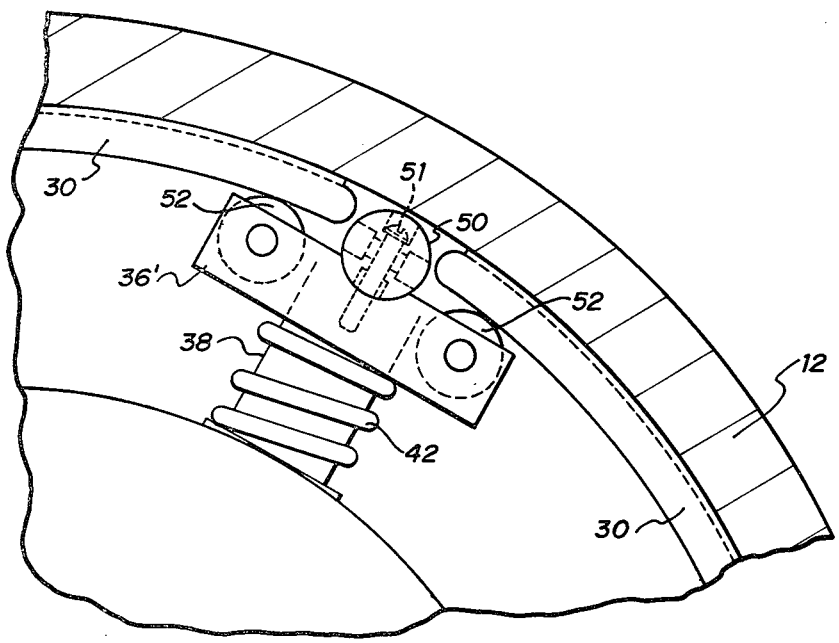
FIG. 4 is a side view of an alternate construction for the intermediate back-up pad support shoe.

Referring now to FIG. 4, there is shown a modification of back-up pad support shoe 36'. Shoe 36' utilizes a cylindrical member 50, as opposed to the semicylindrical member 40 of FIG. 3. In addition shoe 36' incorporates rollers 52 in place of the arcuate surfaces utilized by shoes 36. It will thus be apparent that the rounded ends of adjacent pads 30 are supported by rollers 52 of support shoe 36'. Shoe 36' is preferrably constructed of hard anodized aluminum identical to that employed for pads 30. Other than the use of cylindrical member 50 and roller 52, support shoe 36' functions similarly to support 36 hereinbefore described. Member 50 is secured to shoe 36' by suitable screws 51 extending through holes in member 50. Member 50 thus may be used in four different positions, resulting in life four times the life of the member 40, FIG. 3.

In view of the foregoing it will be apparent that the present invention comprises an improved back-up pad for welding which incorporates numerous advantages over the prior art. Superior use for life without contamination of the joints being welded are but two benefits of the invention. Other advantages derived from the use of the invention will readily suggest themselves to those skilled in the art.

Although preferred embodiments of the invention have been illustrated in the accompanying drawings and described in the foregoing detailed description, it will be understood that the invention is not limited to the embodiments disclosed, but is intended to embrace any alternatives, modifications, and rearrangements and/or substitutions of parts or elements as fall within the spirit and scope of the invention.

What is claimed is:

1. A back-up pad mechanism for use in externally welding the joint between ends of pipes in a pipeline, which comprises:
    a plurality of arcuate back-up pads formed of hard anodized aluminum and having curvatures complementary with the interior surfaces of the pipes to substantially span the weld region;
    movable pad shoe means for supporting each of said back-up pads intermediate for the ends thereof for radial movement into and out of contact with the inside surfaces of said pipes;

movable end shoe means for supporting the ends of adjacent back-up pads and each having an intermediate member of cylindrical exterior surface mounted thereon to occupy the space between the ends of adjacent pads while permitting interference free retraction of said pads, said intermediate members being formed of a hard anodized aluminum material; and means for effecting radial movement of said pad shoes, end shoes and intermediate members, and the back-up pads supported thereon.

2. The mechanism of claim 1 wherein said pad shoes and said end shoes include arcuate surfaces of configurations complementary with the interior sides of said back-up pads to provide for distributed support.

3. The mechanism of claim 1 wherein said intermediate members are semi-cylinders with a radius of about the thickness of said back-up pads and oriented with the cylinder axis parallel to the axis of said pipes.

4. The mechanism of claim 1 wherein said intermediate member is a cylinder whose axis is parallel with the axis of said pipes.

5. The mechanism according to claim 4 wherein roller means are secured to each of said end shoe means for supporting the ends of adjacent back-up pads.

6. The mechanism of claim 1 wherein said intermediate shoes and said end shoes are resiliently biased outwardly.

7. A back-up pad mechanism for use in externally welding the joint between ends of pipes in a pipeline, and which is particularly suited for use with a pipe clamping device having a plurality of clamp shoes selectively actuated in radial directions by piston rods into and out of clamping engagement with the inside surfaces of said pipes, said mechanism comprising:

a plurality of arcuate back-up pads formed of hard anodized aluminum and having outside surfaces complementary with the inside surfaces of the pipes;

said back-up pads being sufficiently wide to substantially span the weld region, and each being characterized by rounded ends with a groove extending in the outside surface between the ends;

pad shoe means slidably mounted on certain ones of said piston rods for supporting each of said back-up pads intermediate the ends thereof;

end shoe means slidably mounted on certain other of said piston rods for supporting the ends of adjacent back-up pads, each end shoe means having an intermediate member of cylindrical exterior surface affixed thereon in crosswise relation to the pads to occupy the space between the ends of adjacent pads and permit smooth retraction of the pads;

said pad shoe and end shoe means being formed of hard anodized aluminum material; and means for resiliently biasing said pad shoe means and said end shoe means outwardly so that the back-up pads are moved into and out of engagement with the inside surfaces of said pipes responsive to actuation of the pipe clamp shoes.

* * * * *

UNITED STATES PATENT AND TRADEMARK OFFICE
CERTIFICATE OF CORRECTION

PATENT NO. : 4,165,831
DATED : August 28, 1979
INVENTOR(S) : Talbert D. Connell

It is certified that error appears in the above-identified patent and that said Letters Patent are hereby corrected as shown below:

Column 3, line 15, "feed" should be --found--.

Column 4, line 19, "cylindrical" should be --semicylindrical--.

Signed and Sealed this

Fourth Day of December 1979

[SEAL]

Attest:

Attesting Officer

SIDNEY A. DIAMOND

Commissioner of Patents and Trademarks